US 6,526,257 B2

(12) United States Patent
Doi et al.

(10) Patent No.: US 6,526,257 B2
(45) Date of Patent: Feb. 25, 2003

(54) METHOD AND APPARATUS FOR DISTRIBUTING ELECTRICAL QUESTION AND CORRESPONDING VIDEO MATERIALS

(75) Inventors: Miwako Doi, Kawasaki (JP); Kazushige Ouchi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/880,933

(22) Filed: Jun. 15, 2001

(65) Prior Publication Data
US 2001/0053514 A1 Dec. 20, 2001

(30) Foreign Application Priority Data
Jun. 16, 2000 (JP) ........................................ 2000-181578

(51) Int. Cl.⁷ ........................... G06F 15/00; G06F 17/60
(52) U.S. Cl. ..................................................... 434/350
(58) Field of Search ......................... 434/350, 322, 434/323, 335, 336, 351, 362

(56) References Cited

U.S. PATENT DOCUMENTS

2002/0078176 A * 12/2000 Nomura et al. ............ 709/219
2001/0054019 A1 * 1/2001 de Fabrega ................. 705/35

FOREIGN PATENT DOCUMENTS

| JP | 2000-32383 A | * | 1/2000 | .......... H04N/5/91 |
| JP | 2000-284679 | | 10/2000 | |
| JP | WO 01/73726 A1 | * | 10/2001 | .......... G06F/17/60 |
| JP | 2001-337968 | * | 12/2001 | .......... G06F/17/30 |
| KR | WO 01/50367 A1 | * | 7/2001 | .......... G06F/17/60 |

* cited by examiner

Primary Examiner—Hieu T. Vo
(74) Attorney, Agent, or Firm—Oblon, Spivak, McClelland, Maier & Neustadt, P.C.

(57) ABSTRACT

A method and apparatus for distributing electronic question lists and corresponding video materials over a network is provided. A plurality of electronic question lists is prepared on a storage, each of the electronic question lists including a plurality of question sentences which are forecasted in advance. One of proper question lists is transmitted to a client's computer system via the network. A video material being associated with the question sentence selected by the client is then transmitted to the client's computer system.

26 Claims, 6 Drawing Sheets

| Question | Corresponding video material | Corresponding section |
|---|---|---|
| How can we see people on TV who are actually far from us? | PM1 | PS1 |
| How can we speak using a telephone without cords? | PM1 | PS2 |
| What color are stars? | PM2 | PS3 |
| ---- | ---- | ---- |

FIG. 2A

| Question | Corresponding video material | Corresponding section | Corresponding grade |
|---|---|---|---|
| How can we see people on TV who are actually far from us? | PM1 | PS1 | ELL |
| How can we speak using a telephone without cords? | PM1 | PS2 | ELL |
| What is the mechanism of broadcasting? | PM1 | PS1 | JH |
| What is the mechanism of a cordless telephone? | PM1 | PS2 | JH |
| What color are stars? | PM2 | PS3 | ELL |
| ---- | ---- | ---- | ---- |

FIG. 2B

| Question | Corresponding video material | keyword |
|---|---|---|
| How can we see people on TV who are actually far from us? | PM1 | TV, Broadcast, Mechanism |
| How can we speak using a telephone without cords? | PM1 | Telephone, Mechanism, Cordless |
| What color are stars? | PM2 | Astronomy, Star, Colr |
| ---- | ---- | ---- |

FIG. 2C

| Question | Corresponding video material | Corresponding section | keyword |
|---|---|---|---|
| How can we see people on TV who are actually far from us? | PM1 | PS1 | TV, Broadcast, Mechanism |
| How can we speak using a telephone without cords? | PM1 | PS2 | Telephone, Mechanism, Cordless |
| What color are stars? | PM2 | PS3 | Astronomy, Star, Colr |
| ---- | ---- | ---- | ---- |

FIG. 2D

| Question | Corresponding video material | Corresponding section |
|---|---|---|
| Machanism that people appear on TV | PM1 | PS1 |
| Machanism that a cordless telephone transmits people's voice | PM1 | PS2 |
| Reason why stars vary in color with temperatures | PM2 | PS3 |
| ---- | ---- | ---- |

| keyword syntax | Question syntax |
|---|---|
| Mechanism(S+V+P) | How S+V+P? |
| Mechanism(S+V+O) | How S+V+O? |
| Reason(S+V+C) | How S+V+C? |
| ---- | ---- |

METHOD AND APPARATUS FOR DISTRIBUTING ELECTRICAL QUESTION AND CORRESPONDING VIDEO MATERIALS

CROSS-REFERENCE TO RELATED APPLICATIONS

This application is based upon and claims the benefit of priority from the prior Japanese Patent Application No. 2000-181578, filed Jun. 16, 2000, the entire contents of which are incorporated herein by reference.

BACKGROUND OF THE INVENTION

The present invention relates to a method of distributing video materials to a user via a computer network such as the Internet and an apparatus for reproducing the video materials.

In Japan, the use of the Internet to supply multimedia-teaching material is now under consideration for elementary and secondary education. However, a huge amount of money and a lot of time are required to prepare and provide abundant multimedia-teaching material that are of a quality good enough to maintain students' levels of interest. In order to resolve this problem, a method of making use of new digital TV programs and a method of reusing educational programs that have been televised are proposed.

In digital TV broadcasting, program information called an EPG (Electronic Programming Guide) is added to conventional video and sound data. The EPG is roughly divided into two types: One is described by text (HTML: Hyper Text Markup Language) and the other by multimedia (MPEG-7 or XML (eXtensible Markup Language)). The EPG is multiplexed with a broadcast wave and transmitted together with the video and sound data. A digital-broadcast-compatible TV set samples a data section from the EPG, interprets it and displays a screen for navigation. Using the EPG, the viewer is able to know the contents of a program and thus retrieve desired data. In the EPG, however, the viewer can obtain information of the whole program, but not that of individual scenes of the program.

Let us consider a 30-minute science program about the "weight of air." When a child questions whether air has weight, he or she has to watch the program from its introduction. If, however, the child wants to know what experiment is carried out to investigate that air has weight, he or she need not watch the introduction. Since, in the EPG, only the program information such as "weight of air," "science" and "experiment" is added to the whole program, the child cannot watch or study only the section that he or she wants to.

On the other hand, conventional broadcast programs without EPG are provided with no keywords. To reuse these programs, keywords should be added to them.

In order to resolve the above problems, a study to extract keywords by recognizing sound data contained in a program or analyzing a subtitle of the program is being conducted. Adding keywords to a program by hand is also currently being carried out.

Conventional broadcast programs or new digital broadcast programs with keywords that specify not only the whole but also each section of a program are gradually being introduced. Even though such broadcast programs are adopted in an actual study environment, it is difficult to maintain the students' interest in a topic by use of keywords alone.

Certainly, keywords are useful because a user can easily retrieve desired information. In usual learning, however, it is actually difficult to maintain the students' attention in a particular topic that is needed to be taught. For example, the following method can be adopted. A certain theme is given to a class, and a plurality of words related to the theme are raised from each group of the class, thereby retrieving information using the words as keys. Children will lose interest in this method sooner or later.

If a child does not have much knowledge about what the child wants to know, he or she does not hit upon any suitable keyword for retrieval.

In the conventional method described above, a video material is retrieved using a keyword. Since children are likely to choose an irrelevant keyword in this method because of their ignorance, it is difficult to effectively use the method for teaching while maintaining students' levels of interest.

In order to make up for the insufficient knowledge of children, examples of questions that children wish to raise should be prepared such that they can retrieve video material corresponding to those questions. However, this method would require a lot of time and effort.

BRIEF SUMMARY OF THE INVENTION

The present invention has been developed in consideration of the above situation and an object thereof is to provide a method and apparatus for providing not only video material but also questions that allow children to study while maintaining their interest in the video material.

According to one embodiment of the present invention, there is provided a method for distributing electronic question lists and corresponding video materials over a network, the method comprising storing a plurality of electronic question lists to a storage, each of the electronic question lists including a plurality of question sentences which are forecasted in advance, storing a client's profile to the storage, retrieving, according to the client's profile, one of the question lists from the storage, transmitting the retrieved one of the question lists to a computer system of the client via the network, under the control of the client's computer system, prompting the client to select at least one question sentence from the question lists, accepting the question sentence selected by the client from the network, and transmitting a video material being associated with the accepted question sentence to the client's computer system.

BRIEF DESCRIPTION OF THE SEVERAL VIEWS OF THE DRAWING

FIG. 2A is a table showing an example of a question storage format;

FIG. 2B is a table showing another example of the question storage format;

FIG. 2C is a table showing still another example of the question storage format;

FIG. 2D is a table showing yet another example of the question storage format;

DETAILED DESCRIPTION OF THE INVENTION

[First Embodiment]

Figure 1:
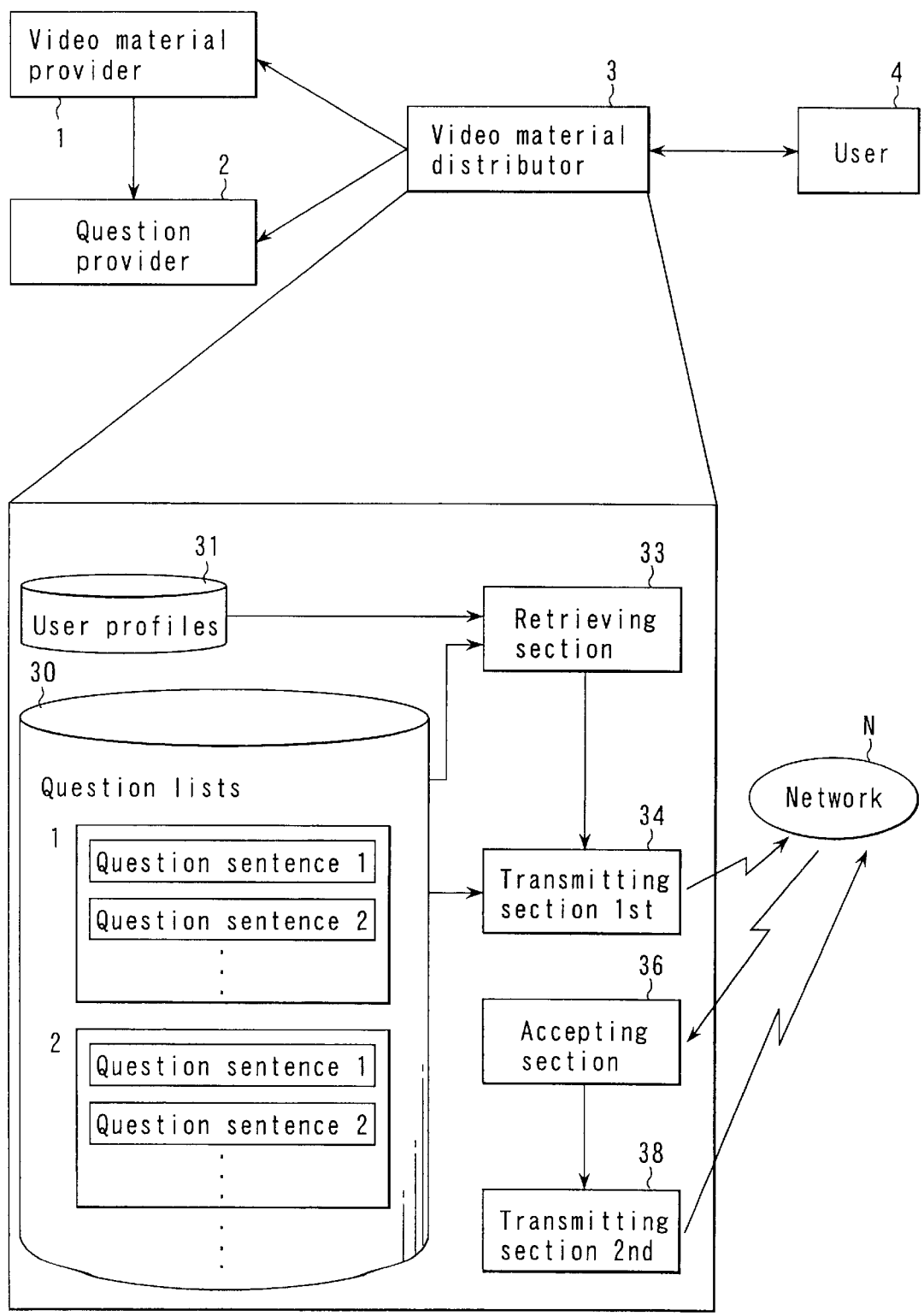
FIG. 1 is a schematic block diagram of a first embodiment of the present invention.

FIG. 1 is a schematic block diagram of a first embodiment of the present invention.

A video material provider 1 stores video material, such as video data, sound data and text data, in a large-scale storage medium such as a disk array or a detachable storage medium such as a DVD (Digital Versatile Disc) under a compression scheme such as MPEG-2 (Moving Pictures Experts Group). The provider 1 also manages the video material and the copyright of video material.

For the video material managed by the provider 1, a question provider 2 creates questions that children are liable to raise or are expected to answer as contents to be learned. The provider 2 also creates questions corresponding to sections of the video material. These questions are provided using storage locations and keywords.

A video material distributor 3 distributes the video material provided by the provider 1 and the questions provided by the provider 2 to a user 4 through a network, a detachable storage medium such as a DVD, or both in combination. The video material distributor 3 provides the user 4 with a question to urge the user to use its corresponding video material actively and effectively. The distributor 3 retrieves a section of the video material that corresponds to the question and distributes it to the user 4. According to the use of the user 4, the distributor 3 distributes money to the providers 1 and 2 or the copyright holder and copyright manager of the video material. The user 4 includes an individual or a group that makes use of the video material using questions distributed from the video material distributor 3. The system shown in FIG. 1 can thus be called a video material distribution business.

More specifically, a computer system embodied for video material distributor 3 is arranged as bellow. That is, the system comprises a question list storing section 30 to store a plurality of electronic question lists to a storage, each of the electronic question lists including a plurality of question sentences which are forecasted in advance, a profile storing section 31 to store a user's (client's) profile, a retrieving section 33 to retrieve, according to the client's profile 31, one of the question lists from the question list storing section 30, a first transmitting section 34 to transmit the retrieved one of the question lists to a computer system of the client 4 via the network N, an accepting section 36 to accept one question sentence selected by the client computer system 4 from the network N, and a second transmitting section 38 to transmit a video material being associated with the accepted question sentence to the client's computer system 4.

FIGS. 2A to 2D show examples of a storage format of questions provided by the question provider 2 and addresses of storage locations of video material corresponding to the questions.

In the example of FIG. 2A, a question, a storage location of video material corresponding to an answer to the question, and a section of the video material corresponding to the answer are stored as one set. Referring to FIG. 2A, there is a question "How can we see people on TV who are actually far from us?" Video material, which explains radio waves related to an answer to the question, is stored in PM1. The section dealing with "television" in the video material is stored in PS1.

The next question is "How can we speak using a telephone without cords?" Since the answer to the question is also related to radio waves, the same video material is stored in the same address PM1. However, it is the section of "telephone" in the video material that corresponds to the answer. This section is therefore stored in a different location PS2.

It can be considered that a plurality of video material providers, question providers, video material distributors, and users are involved with the above video material distribution business. The storage location PM1 therefore contains both video material provider identification information for identifying the video material provider 1 and video material identification information for identifying video material provided by the provider 1.

The video material identification information includes copyright identification information for identifying the copyright holder of the video material. It may also include information for identifying a compression scheme necessary for replaying video material.

The next question is "What color are stars?" Since the answer to this question relates to astronomy, different video material is stored in a different location PM2 and the corresponding section of the video material is stored in a different location PS3.

FIG. 2B shows another example of the question storage format. The example differs from that of FIG. 2A in that items corresponding to grades are added. In the items, "EL" of "ELL" represents elementary schools and the last "L" of "ELL" represents lower grades of the elementary schools. That is, "ELL" means that the question is suitable for students in the lower grades of elementary schools. "ELM" represents middle grades of elementary schools and "ELH" represents higher grades thereof. "JH" indicates junior high school students and "HI" shows high school students.

In the example of FIG. 2B, a first question "How can we see people on TV who are actually far from us?" can be used for the lower-grade students of elementary schools or higher-grade students. On the other hand, a third question "What is the mechanism of broadcasting?" is suitable for junior high school students or higher-grade students. Though the first and third questions differ from each other, their corresponding pieces of video material are the same and thus their corresponding sections are stored in the same location PS2.

As described above, the questions are classified and stored according to their corresponding grades. This method is thus very effective since questions can be provided appropriate to the grade of the learner.

FIG. 2C shows still another example of the question storage format. In FIG. 2A, the sections of the video material corresponding to the questions are directly stored. In FIG. 2C, a plurality of keywords are stored in correspondence with questions, which produces the following advantages. If a user cannot obtain access to a video material due to suspended operations of video material provider, he or she can search for video material of other video material providers using a selected keyword. The user can also search for a home page on the Web of the Internet using the keyword. A question storage format of a combination of the examples shown in FIGS. 2A and 2C can be used.

The question provider 2 prepares the above questions with reference to the video material of the video material provider 1 and purchases them from school teachers, textbook publishers, correspondence-education dealers, and the like. The provider 2 then edits the questions created by a question creating section, which will be described later.

The video material distributor 3 can also be operated by the video material provider 1, the question provider 2, or the copyright manager.

Figure 3:
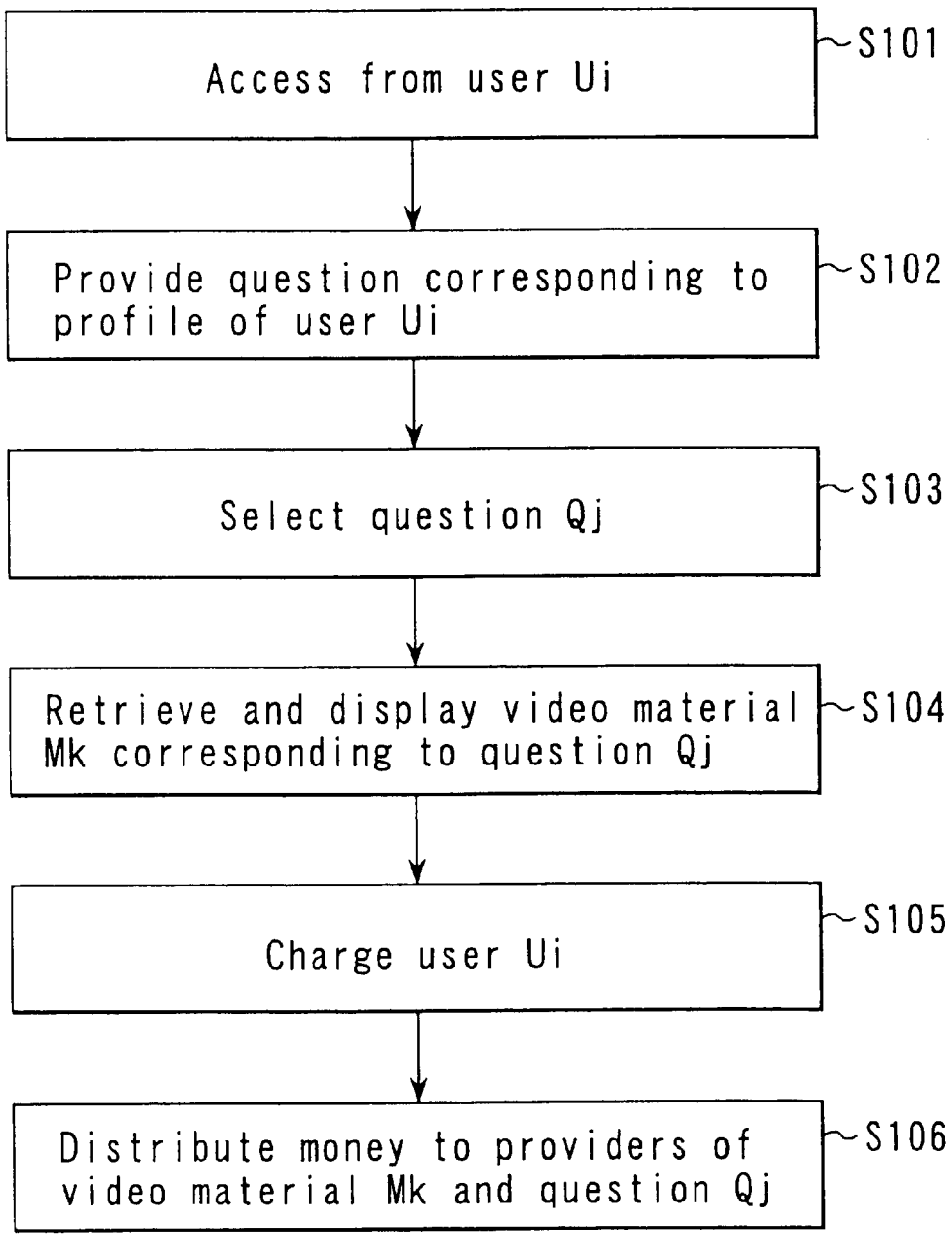
FIG. 3 is a flowchart of a process according to the first embodiment of the present invention.

FIG. 3 shows a flow of a process of the video material distributor 3. First, a user Ui accesses the Web site of the video material distributor 3 or a recording medium such as a DVD distributed from the distributor 3 (step S101).

The video material distributor 3 asks a suitable question referring to the terminal user Ui to obtain a profile thereof (age, interests, payment situation, progress of learning, history of use, etc.) that the distributor 3 stores (step S102). If a new user obtains access or the user Ui wishes to change his or her profile, the distributor 3 provides a screen for changing the profile and raises questions after the change.

Then, the distributor 3 receives a question Qj from the user Ui (step S103). The question Qj is selected as an interesting one from among the questions raised by the distributor 3.

The video material distributor 3 retrieves video material Mk corresponding to the selected question Qj with reference to the table of FIG. 2A (step S104). Then, the distributor 3 requests the video material provider 2 to provide the video material Mk and downloads it through a network or a leased line.

Based on the profile of the user Ui, the distributor 3 may retrieve the related video material Mk from those downloaded in advance from the provider 2 via a network or a leased line. The distributor 3 may also retrieve related video material Mk from a recording medium, such as a DVD, of the user Ui. The distributor 3 thus decodes the video material Mk and reproduces the desired section when the need arises.

The video material distributor 3 charges the user Ui for use of the video material (step S105). The charges vary with the number of questions used, the amount of video material, and the grade. The distributor 3 can charge the user Ui by, e.g., a credit card or a postal transfer sheet that is sent to the user together with a DVD storing the video material. When the user Ui is a member of a group such as a school, the distributor 3 can charge a municipality to which the school belongs. The present invention is not limited to any particular charging method.

Finally, the video material distributor 3 distributes the money collected from the user Ui to the video material provider 1 that provided the video material Mk and the question provider 2 that provided the question Qj (step S106). When the need arises, the distributor 3 distributes the money to the copyright manager (not shown) for managing the copyright of the video material Mk.

The user Ui can not only choose a question but also input a question directly. When the question input by the user is a new one and the question provider 2 wishes to reuse it, the provider 2 makes a contract with the user Ui. If the provider 2 makes a profit from the question of the user Ui, it pays royalties to the user Ui as a copyright holder of the question.

The first embodiment described above will provide a provide a method and apparatus for providing not only video material but also questions that allow children to study while maintaining their interest in the video material.

[Second Embodiment]

Figures 4, 5, 6:
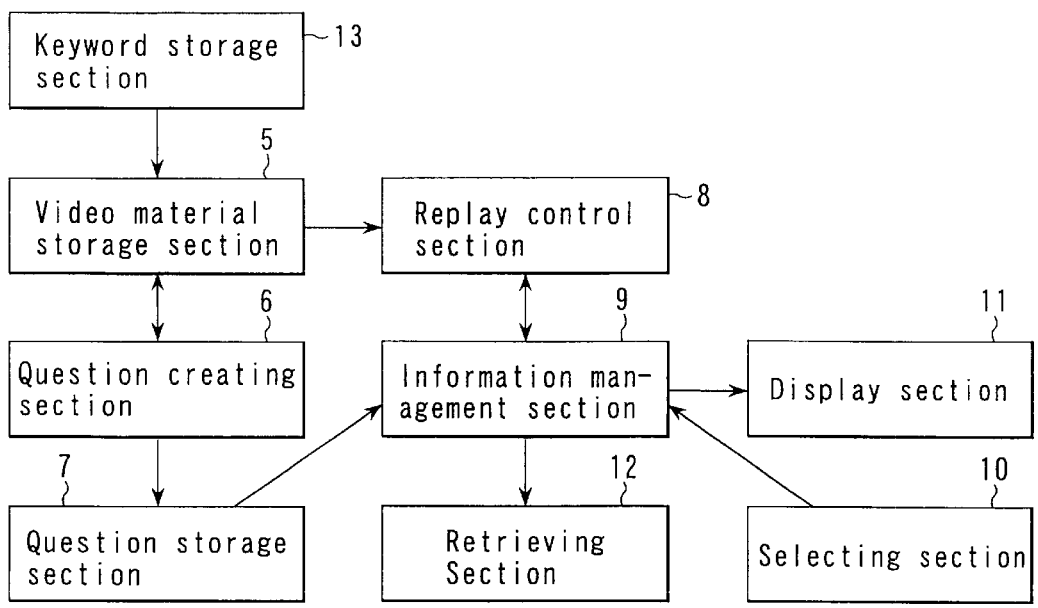
FIG. 4 is a schematic block diagram of a second embodiment of the present invention.
FIG. 5 is a table showing an example of a keyword storage format.
FIG. 6 is a table showing an example of stored syntax.

FIG. 4 is a schematic block diagram of a second embodiment of the present invention. A video material storage section 5 stores video material, such as video data and sound data, in a large-scale storage medium such as a disk array or a detachable storage medium such as a DVD under a compression scheme such as MPEG-2 (Moving Pictures Experts Group).

A keyword storage section 13 stores keywords corresponding to the contents of the video material stored in the video material storage section 5. Based on the keywords stored in the section 13, a question creating section 6 creates questions that children are liable to raise for the video material stored in the storage section 5 and to which the children should answer, to derive knowledge.

A question storage section 7 stores the questions created by the question creating section 6 and sections of the video material corresponding to the answers to the questions. A display section 11 displays the questions stored in the question storage section 7 and the video material stored in the video material storage section 5.

A selecting section 10 prompts a user to select one of the questions displayed on the display section 11. A retrieving section 12 retrieves a section corresponding to the question selected by the selecting section 10 from the video material stored in the video material storage section 5.

A replay control section 8 replays the video material from the section retrieved by the retrieving section 12.

The above process is controlled by an information management section 9.

The storage format of the questions stored in the question storage section 7 and the addresses of storage locations of video material corresponding to the questions are the same as those shown in FIGS. 2A to 2D of the first embodiment.

The keyword storage section 13 stores keywords and their corresponding pieces of video material and sections.

Figure 8:
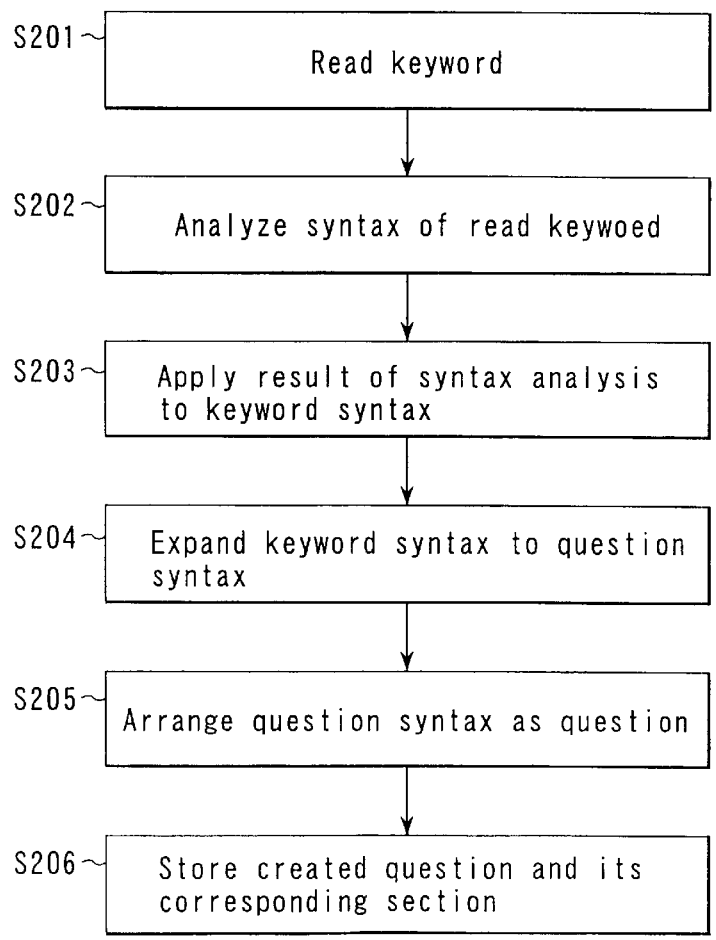
FIG. 8 is a flowchart of a process according to the second embodiment of the present invention.

FIG. 8 shows a flow of the process of the question creating section 6. The section 6 has a question syntax template for creating a question from the syntax of keywords as shown in FIG. 6. A process of creating a question using the syntax template based on the keywords shown in FIG. 5 will be explained below.

Figure 7:
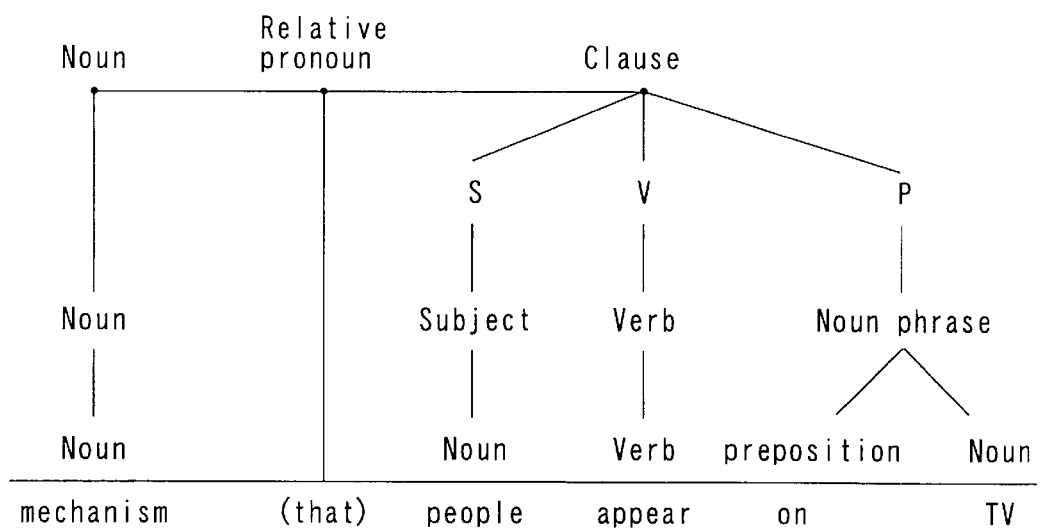
FIG. 7 is a tree showing an example of syntactic analysis.

First, a keyword "Mechanism That People Appear On TV" is read out (step S201). Then, the syntax of the read keyword is analyzed as shown in FIG. 7 (step S202). The analysis is as follows:

"Mechanism" is a noun. "That" is a relative pronoun. "People" is a noun and a subject S. "Appear" is a verb V (passive). "ON" is a preposition, and "TV" is a noun. "ON" and "TV" are combined into a noun phrase P indicating a location. S, V and P are combined into a clause that modifies the noun "Mechanism."

If the result of the analysis is applied to the keyword syntax shown in FIG. 6 (step S203), the following is given:

Mechanism that (S: people+V: appear+P: on TV)

If the above is expanded to the question syntax shown in FIG. 6 (step S204), the following is obtained:

How do S (people) V (appear) P (on TV)?

If the above question syntax is arranged (step S205), the following normal question is obtained:

How do people appear on TV?

The created question are stored in the question storage section 7 together with keywords and their corresponding pieces of video material and sections as shown in FIG. 2 (step S206).

Since the use of video material after the questions are created and stored is the same as that in the first embodiment, its description is omitted here.

The keyword storage section 13, video material storage section 5, question creating section 6 and question storage section 7 can be operated on a user's personal computer for replaying video material. Some of these sections can be operated on a server in a location different from that of a user's personal computer through a network.

In FIG. 6, one question syntax corresponds to one keyword syntax. The present invention is not always limited to this correspondence. If a variety of question syntaxes are prepared for one keyword syntax, a variety of questions can be created from one keyword. Further, a noun substitution dictionary for substituting nouns that are easier to understand can be prepared for lower-grade students to create questions according to the grades.

Figure 9:
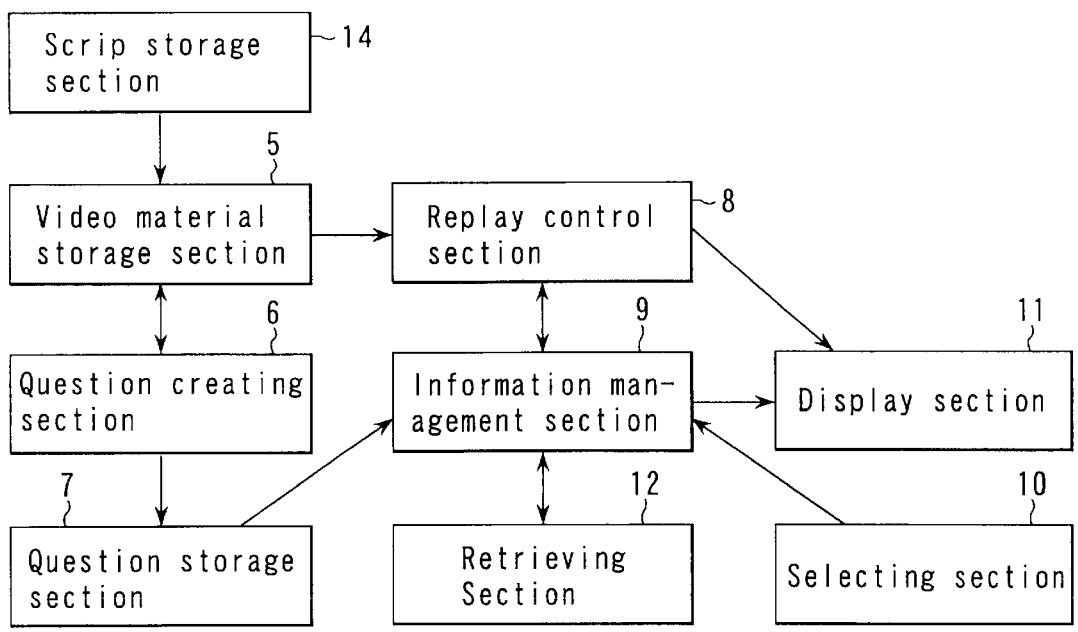
FIG. 9 is a schematic block diagram showing a modification to the second embodiment of the present invention.

The foregoing second embodiment is directed to the method of creating a question based on a keyword attached to a video material. The present invention is not limited to this method. For example, as shown in FIG. 9, a question can be created based on a script stored in a script storage section 14, in place of keywords.

Even though it is not the keywords but the script that the question creating section 6 is directed to, the syntax analysis is performed in the same manner. Since the sentences of the script are more accurate than the keywords, various questions can be created based thereon.

Figure 10:
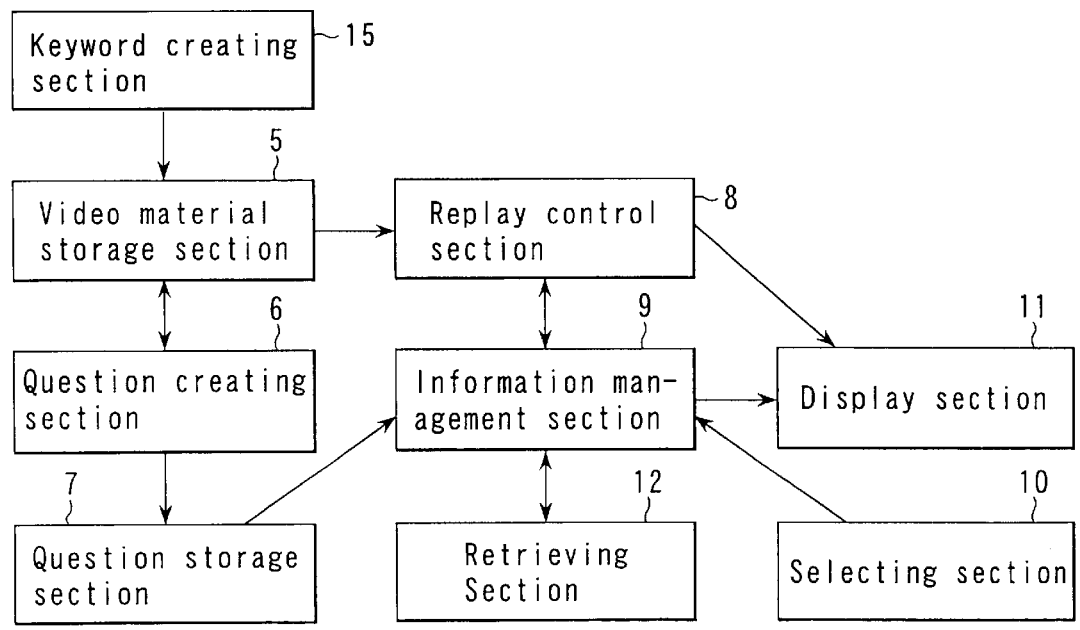
FIG. 10 is a schematic block diagram showing another modification to the second embodiment of the present invention.

The above embodiment is based on the premise that the keywords are attached in advance to the video material. However, it takes a lot of time and effort to attach keywords to all of a great amount of video material. To do so is very difficult in terms of time and cost. Thus, a keyword creating section 15 shown in FIG. 10 can be used to create keywords by analyzing sound data and subtitles.

According to the present invention, questions can be created from the keywords and script. Thus, time and effort to create the question can greatly be shortened and a larger number of questions can easily be obtained. Consequently, a great advantage can be produced.

The process of the above embodiments of the present invention is achieved by programs executable by computers. The programs can be stored in a storage medium that can be accessed by computers.

As a storage medium of the present invention, there are a magnetic disk, a floppy disk, a hard disk, an optical disc (CD-ROM, CD-R, DVD, etc.), a magneto-optical disk (MO), a semiconductor memory, and the like. Any storage format can be used if the storage medium can be accessed by computers.

An OS (operating system) that is operated in response to an instruction of programs installed in the computer from a recording medium, database management software, middleware (MW) of a network, and the like may execute part of each process for achieving the present invention.

The storage medium of the present invention includes not only a medium provided independently of a computer but also a medium for downloading programs from a LAN, the Internet or the like and storing or temporarily storing them.

The number of storage mediums is not limited to one. A plurality of mediums can be used to execute a process of the present invention whatever their structures are.

The computer of the present invention execute a process of the present invention based on programs stored in the storage medium. The computer can be constituted of one device such as a personal computer, a plurality of devices connected to a network, or the like.

The computer of the present invention includes a processor and a microcomputer included in an information processing apparatus as well as a personal computer. It is a general term of an apparatus or a device capable of fulfilling the functions of the present invention by programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus configured to distribute electronic question lists and corresponding video materials over a network, the apparatus comprising:
   a question list storing device configured to store a plurality of electronic question lists, each of the electronic question lists including a plurality of question sentences which are forecasted in advance;
   a profile storing device configured to store a client's profile;
   a retrieving device configured to retrieve, according to the client's profile, one of the question lists from the question list storing device;
   a first transmitting device configured to transmit the retrieved one of the question lists to a computer system of the client via the network;
   an accepting device configured to accept one question sentence selected by the client computer system from the network; and
   a second transmitting device configured to transmit a video material being associated with the accepted question sentence to the client's computer system.

2. An apparatus of claim 1, wherein one of said question lists includes a first identifier which associate said question sentence with said video material and a second identifier which indicates an associated part in the video material.

3. An apparatus of claim 1, wherein one of said question lists includes a first identifier which associate said question sentence with said video material and one or more keywords which are associated with the question sentence.

4. An apparatus of claim 1, wherein said client's profile includes information indicative of a corresponding grade or a progress of learning.

5. An apparatus configured to distribute electronic question lists and corresponding video materials over a network, the apparatus comprising:
   a video material storing device configured to store a video material;
   a keyword storing device configured to store a keyword sentence having a construction of sentence with a plurality of keywords;
   a question sentence creating device configured to create one or more question sentences by pasting the keyword sentence;
   a question list storing device configured to store a question list including said created question sentences;
   a profile storing device configured to store a client's profile;
   a retrieving device configured to retrieve, according to the client's profile, one of the question lists from the question list storing device;
   a first transmitting device configured to transmit the retrieved one of the question lists to a computer system of the client via the network;

an accepting device configured to accept one question sentence selected by the client computer system from the network; and a second transmitting device configured to transmit a video material being associated with the accepted question sentence to the client's computer system.

6. An apparatus of claim 5, further comprising a keyword creating device configured to create said keywords by an analytic processing of said video material.

7. An apparatus of claim 5, wherein one of said question lists includes a first identifier which associate said question sentence with said video material and a second identifier which indicates an associated part in the video material.

8. An apparatus of claim 5, wherein said client's profile includes information indicative of a corresponding grade or a progress of learning a second accepting device configured to accept a new question sentence which is directly input and edited at said client's computer system; and a creating device configured to create copyright information for the new question sentence.

9. A recording medium having thereon a computer readable program for enabling a computer to reproduce a video material, said program comprising:

code means for enabling the computer to acquire an electronic question list including a plurality of question sentences which are forecasted in advance;

code means for enabling the computer to acquire a plurality of the video materials;

code means for enabling the computer to prompt a client to select one of the question sentences;

code means for enabling the computer to retrieve one of the video materials being associated with the question sentence selected by the client; and code means for enabling the computer to reproduce the retrieved video material.

10. A recording medium of claim 9, further comprising code means for receiving said question list from a computer system of a question provider via a network.

11. A recording medium of claim 9, further comprising code means for receiving said video materials from a computer system of a video material provider via a network.

12. A method for distributing electronic question lists and corresponding video materials over a network, the method comprising:

storing a plurality of electronic question lists to a storage, each of the electronic question lists including a plurality of question sentences which are forecasted in advance;

storing a client's profile to the storage;

retrieving, according to the client's profile, one of the question lists from the storage;

transmitting the retrieved one of the question lists to a computer system of the client via the network;

under the control of the client's computer system, prompting the client to select at least one question sentence from the question lists;

accepting the question sentence selected by the client from the network; and transmitting a video material being associated with the accepted question sentence to the client's computer system.

13. A method of claim 12, wherein one of said question lists includes a first identifier which associate said question sentence with said video material and a second identifier which indicates an associated part in the video material.

14. A method of claim 12, wherein one of said question lists includes a first identifier which associate said question sentence with said video material and one or more keywords which are associated with the question sentence.

15. A method of claim 12, wherein said client's profile includes information indicative of a corresponding grade or a progress of learning.

16. A method of claim 12, further comprising accepting a new question sentence which is directly input and edited at said client's computer system; and storing the new question sentence to said storage and creating copyright information for the new question sentence.

17. A method for distributing electronic question lists and corresponding video materials over a network, the method comprising:

receiving a video material from a first computer system via the network and temporarily storing the video material to a storage;

receiving a plurality of electronic question lists from a second computer system via the network and temporarily storing the electronic question lists to the storage, each of the electronic question lists including a plurality of question sentences which are forecasted in advance;

storing a client's profile to the storage;

retrieving, according to the client's profile, one of the question lists from the storage;

transmitting the retrieved one of the question lists to a computer system of the client via the network;

under the control of the client's computer system, prompting the client to select at least one question sentence from the question lists;

accepting the question sentence selected by the client from the network; and transmitting a video material being associated with the accepted question sentence to the client's computer system.

18. A method of claim 17, wherein one of said question lists includes a first identifier which associate said question sentence with said video material and a second identifier which indicates an associated part in the video material.

19. A method of claim 17, wherein one of said question lists includes a first identifier which associate said question sentence with said video material and one or more keywords which are associated with the question sentence.

20. A method of claim 17, wherein said client's profile includes information indicative of a corresponding grade or a progress of learning.

21. A method of claim 17, further comprising accepting a new question sentence which is directly input and edited at said client's computer system; and storing the new question sentence to said storage and creating copyright information for the new question sentence.

22. A method for distributing electronic question lists and corresponding video materials over a network, the method comprising:

storing a keyword sentence having a construction of sentence with a plurality of keywords to a storage;

parsing the keyword sentence thus creating one or more question sentences;

storing a question list including said created question sentences to the storage;

storing a client's profile to the storage;

retrieving, according to the client's profile, one of the question lists from the storage;

transmitting the retrieved one of the question lists to a computer system of the client via the network;

under the control of the client's computer system, prompting the client to select at least one question sentence from the question lists;

accepting the question sentence selected by the client from the network; and transmitting a video material being associated with the accepted question sentence to the client's computer system.

23. A method of claim 22, further comprising creating said keywords by an analytic processing of said video material.

24. A method of claim 22, wherein one of said question lists includes a first identifier which associate said question sentence with said video material and a second identifier which indicates an associated part in the video material.

25. A method of claim 22, wherein said client's profile includes information indicative of a corresponding grade or a progress of learning.

26. A method of claim 22, further comprising accepting a new question sentence which is directly input and edited at said client's computer system; and storing the new question sentence to said storage and creating copyright information for the new question sentence.

* * * * *